US011132603B2

(12) United States Patent
Shon et al.

(10) Patent No.: US 11,132,603 B2
(45) Date of Patent: Sep. 28, 2021

(54) METHOD AND APPARATUS FOR GENERATING ONE CLASS MODEL BASED ON DATA FREQUENCY

(71) Applicant: AJOU UNIVERSITY INDUSTRY-ACADEMIC COOPERATION FOUNDATION, Suwon-si (KR)

(72) Inventors: Tae Shik Shon, Suwon-si (KR); Seok Jun Lee, Seoul (KR); Seok Cheol Lee, Bucheon-si (KR); Hyung Uk Yoo, Seoul (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 1067 days.

(21) Appl. No.: 15/687,773

(22) Filed: Aug. 28, 2017

(65) Prior Publication Data

US 2018/0240016 A1    Aug. 23, 2018

(30) Foreign Application Priority Data

Feb. 20, 2017   (KR) .................. 10-2017-0022057

(51) Int. Cl.
*G06N 3/08* (2006.01)
*G06F 7/523* (2006.01)
(Continued)

(52) U.S. Cl.
CPC ............... *G06N 3/08* (2013.01); *G06F 7/523* (2013.01); *G06N 20/00* (2019.01); *G06N 20/10* (2019.01)

(58) Field of Classification Search
CPC .......... G06N 3/08; G06N 20/10; G06N 20/00
See application file for complete search history.

(56) References Cited

U.S. PATENT DOCUMENTS

2007/0150954 A1*   6/2007   Shon ................... H04L 63/1425
726/23

FOREIGN PATENT DOCUMENTS

| KR | 10-2006-0087585 A | 8/2006 |
|---|---|---|
| KR | 10-2016-0084453 A | 7/2016 |

OTHER PUBLICATIONS

Taylor, Adrian, Nathalie Japkowicz, and Sylvain Leblanc. "Frequency-based anomaly detection for the automotive CAN bus." 2015 World Congress on Industrial Control Systems Security (WCICSS). IEEE, 2015. (Year: 2015).*

(Continued)

*Primary Examiner* — Benjamin P Geib
(74) *Attorney, Agent, or Firm* — Sughrue Mion, PLLC

(57) ABSTRACT

Provided is a method for generating a one class model based on a data frequency. The method for generating a one class model based on a data frequency includes: generating, by a machine learning apparatus, a plurality of spatial coordinates by arranging a plurality of learning data in corresponding coordinates in a feature space; classifying, by the machine learning apparatus, the plurality of spatial coordinates into a plurality of internal coordinates PI and a plurality of external coordinates PO based on a frequency of the learning data arranged in the respective spatial coordinates which belong to the plurality of spatial coordinates; and generating, by the machine learning apparatus, a one class model based on the plurality of internal coordinates PI based on mutual spatial distances of the plurality of external coordinates PO and the plurality of internal coordinates PI.

10 Claims, 9 Drawing Sheets

(51) Int. Cl.
G06N 20/00 (2019.01)
G06N 20/10 (2019.01)

(56) References Cited

OTHER PUBLICATIONS

Zhang, Ming, Boyi Xu, and Jie Gong. "An anomaly detection model based on one-class svm to detect network intrusions." 2015 11th International Conference on Mobile Ad-hoc and Sensor Networks (MSN). IEEE, 2015. (Year: 2015).*
Maglaras, Leandros A., and Jianmin Jiang. "Intrusion detection in SCADA systems using machine learning techniques." 2014 Science and Information Conference. IEEE, 2014. (Year: 2014).*
Barbosa, Rafael Ramos Regis, Ramin Sadre, and Aiko Pras. "Towards periodicity based anomaly detection in SCADA networks." Proceedings of 2012 IEEE 17th International Conference on Emerging Technologies & Factory Automation (ETFA 2012). IEEE, 2012. (Year: 2012).*
Jiang, Jianmin, and Lasith Yasakethu. "Anomaly detection via one class svm for protection of scada systems." 2013 International Conference on Cyber-Enabled Distributed Computing and Knowledge Discovery. IEEE, 2013. (Year: 2013).*
Lee et al., "One-Class Classification Model Based on Lexical Information and Syntactic Patterns", Journal of KIISE, vol. 42, No. 6, pp. 817-822, Jun. 2015 (6 pages total).
Maji et al., "Efficient Classification for Additive Kernel SVMs", IEEE Transactions on Pattern Analysis and Machine Intelligence, vol. 35. No. 1, 2012 (13 pages total).
Communication dated Nov. 30, 2018 from the Korean Intellectual Property Office in Application No. 10-2017-0022057.
Shon et al., "A hybrid machine learning approach to network anomaly detection", Information Sciences, vol. 177 (2007) pp. 3799-3821 (23 pages total).
Communication dated May 19, 2018 from the Korean Intellectual Property Office in Application No. 10-2017-0022057.

* cited by examiner

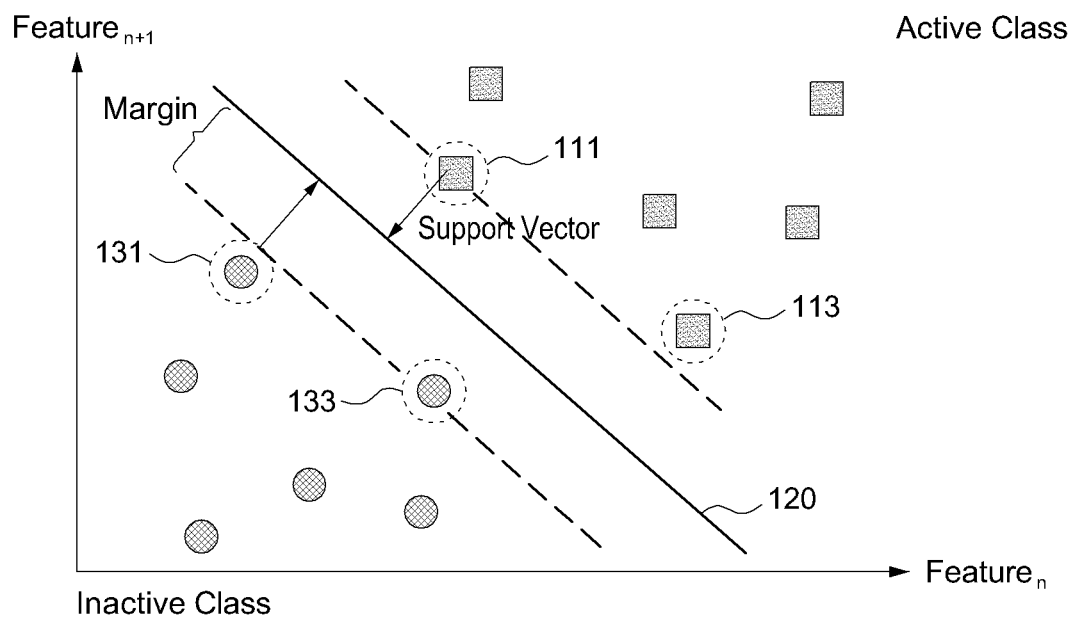
[FIG. 1A]

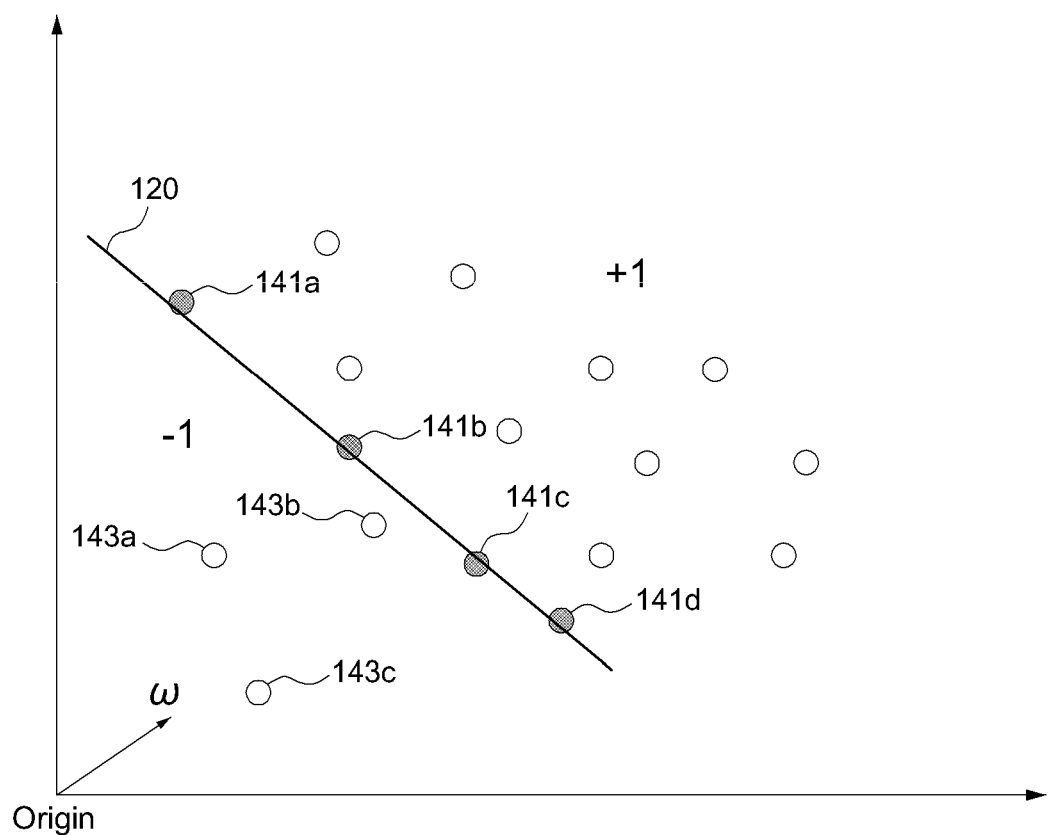
[FIG. 1B]

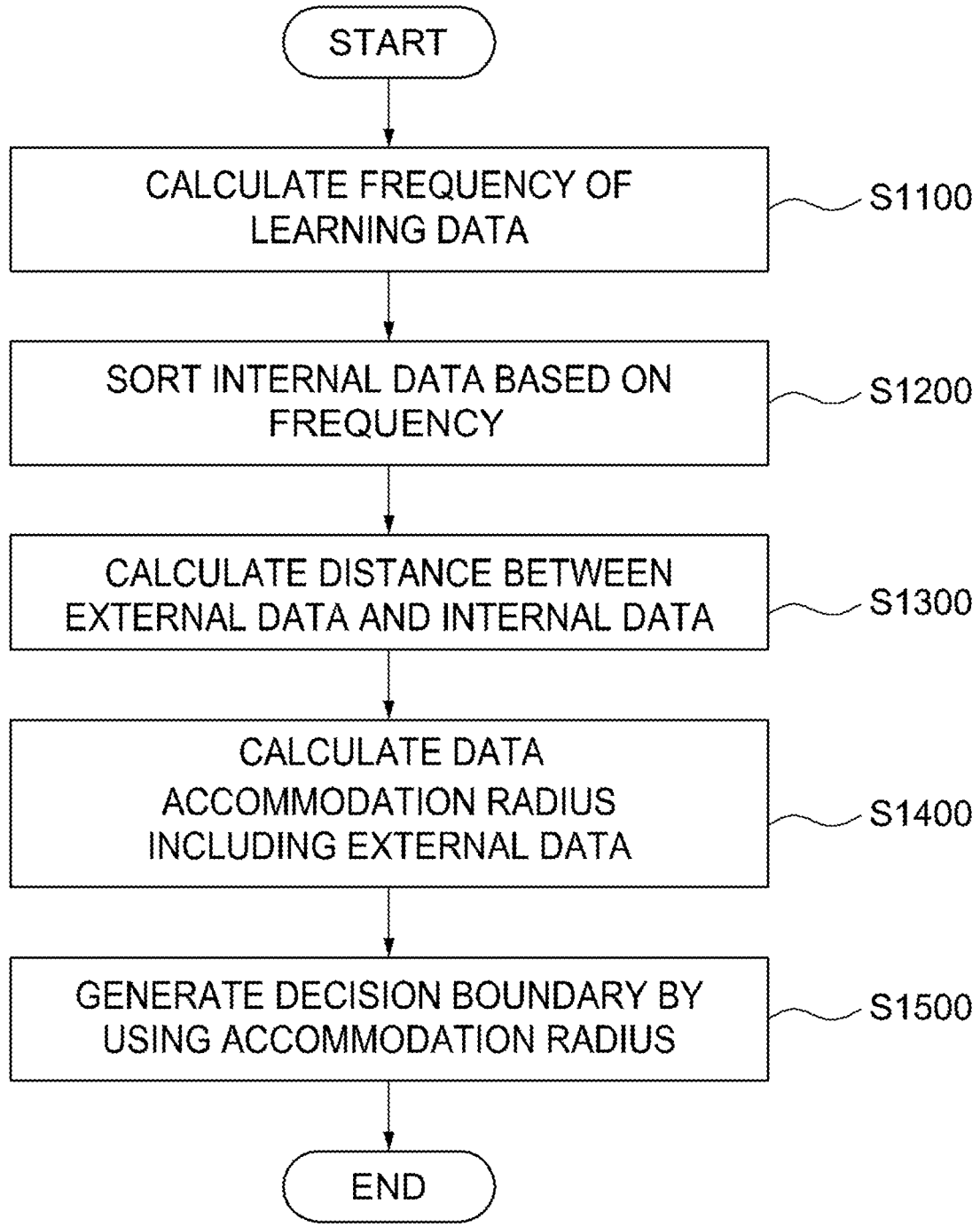
[FIG. 2]

[FIG. 3A]

Training Dataset

| | Headers | Payload |
|---|---|---|
| Packet 1 | Headers | Field A, Field B, Field C |
| Packet 2 | Headers | Field A, Field C, Field D |
| Packet 3 | Headers | Field B |
| Packet 4 | Headers | Field A, Field B, Field C |
| Packet 5 | Headers | Field B |
| Packet 6 | Headers | Field A, Field B, Field C |
| Packet 7 | Headers | Field A, Field C, Field D |
| Packet 8 | Headers | |
| Packet 9 | Headers | Field A, Field B, Field C |
| Packet 10 | Headers | Field A, Field B, Field C |
| Packet 11 | Headers | |
| Packet 12 | Headers | Field A, Field C, Field D |

After Preprocessing

|  | Headers | Payload |  |
|---|---|---|---|
| Packet 1 | Headers | Field A, Field B, Field C | ⎫ |
| Packet 4 | Headers | Field A, Field B, Field C | ⎪ Packet |
| Packet 6 | Headers | Field A, Field B, Field C | ⎬ Group 1 |
| Packet 9 | Headers | Field A, Field B, Field C | ⎪ |
| Packet 10 | Headers | Field A, Field B, Field C | ⎭ |
| ⋮ |  |  |  |
| Packet 2 | Headers | Field A, Field C, Field D | ⎫ |
| Packet 7 | Headers | Field A, Field C, Field D | ⎬ Packet Group 2 |
| Packet 12 | Headers | Field A, Field C, Field D | ⎭ |
| ⋮ |  |  |  |
| Packet 3 | Headers | Field B | ⎫ Packet |
| Packet 5 | Headers | Field B | ⎭ Group 3 |
| ⋮ |  |  |  |
| Packet 8 | Headers |  | ⎫ Packet |
| Packet 11 | Headers |  | ⎭ Group 4 |
| ⋮ |  |  |  |

[FIG. 4]
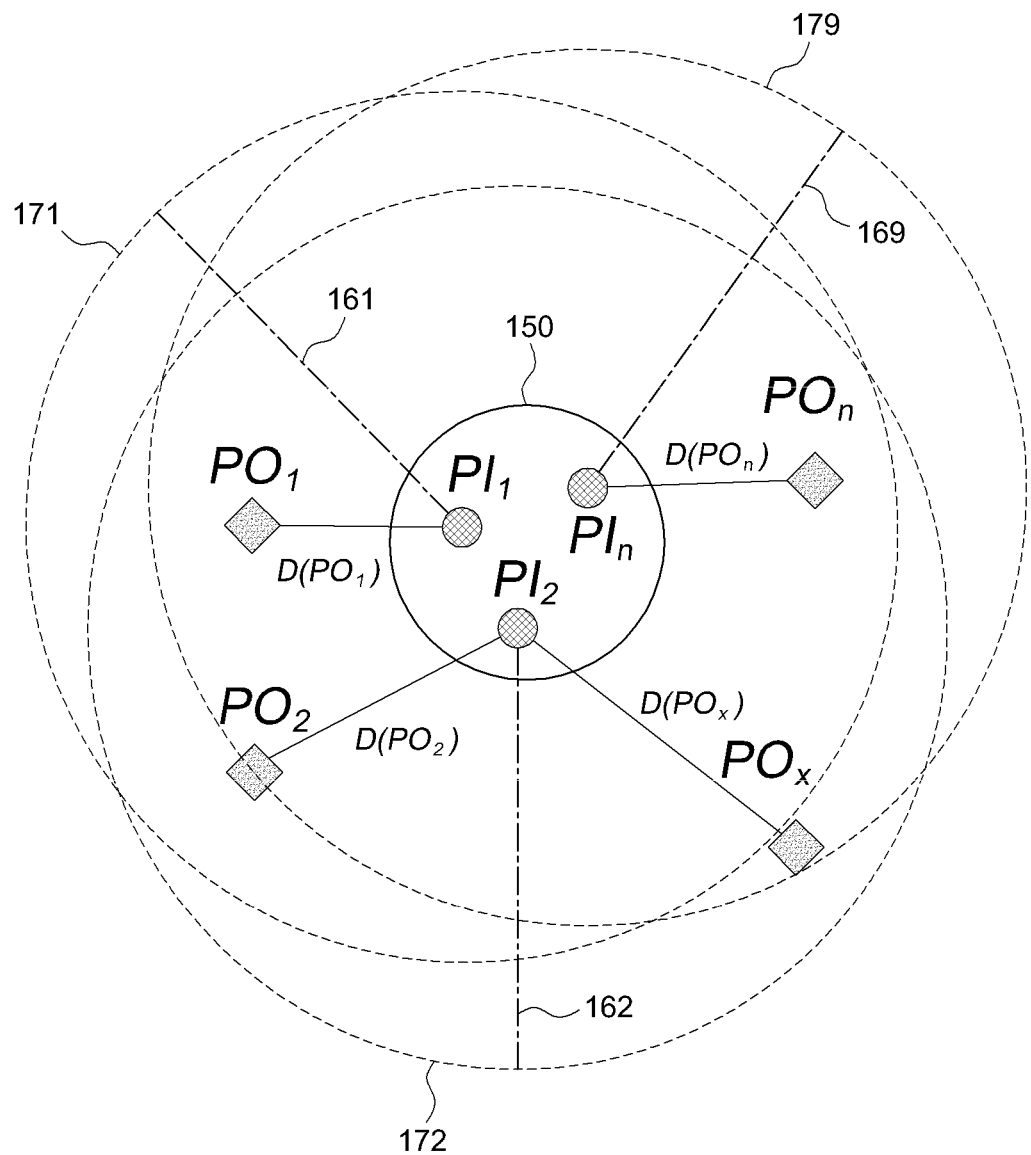

[FIG. 5A]

$$D(PO_x) = min [D(PO_x, PI_1), \ldots, D(PO_x, PI_n)]$$

[FIG. 5B]

$$R = m \times max[D(PO_1), \ldots, D(PO_n)]$$

[FIG. 6]
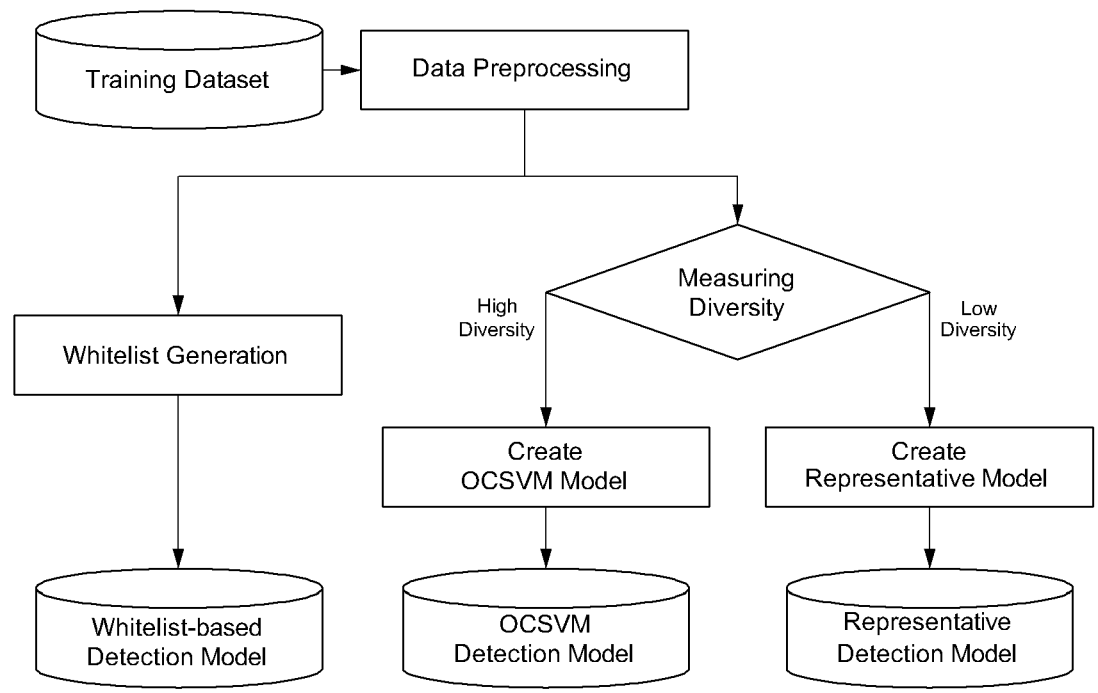

[FIG. 7]
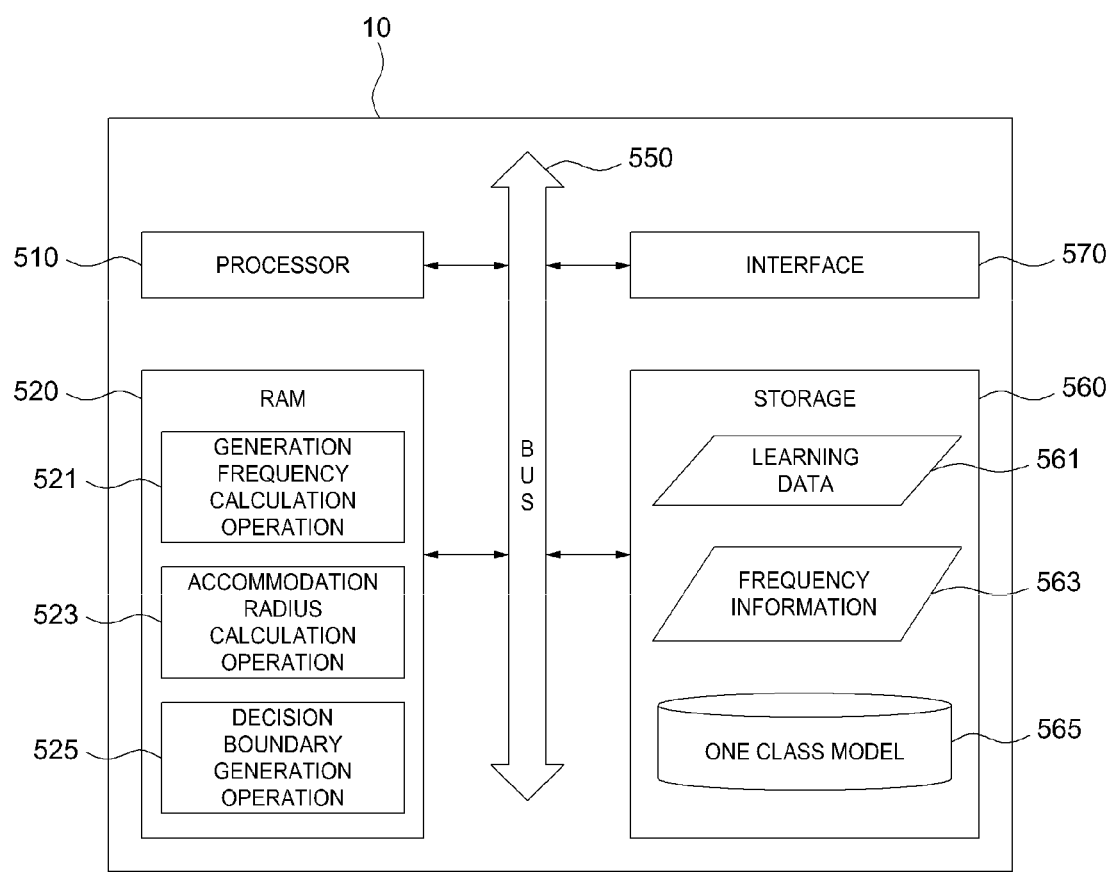

METHOD AND APPARATUS FOR GENERATING ONE CLASS MODEL BASED ON DATA FREQUENCY

CROSS-REFERENCE TO RELATED APPLICATIONS

This application claims the priority of Korean Patent Application No. 10-2017-0022057 filed on Feb. 20, 2017, in the Korean Intellectual Property Office, the disclosure of which is incorporated herein by reference.

BACKGROUND

Field

The present disclosure relates to a method and an apparatus for generating a one class model based on a data frequency. More particularly, the present disclosure relates to a method considering a frequency of data and an apparatus for performing the method at the time of generating a learning model by using a one class support vector machine (OCSVM).

Description of the Related Art

Examples of a method for detecting abnormality or normality by analyzing data include blacklist and whitelist. Two techniques have a common point that a static rule is made by analyzing the data and the abnormality or normality is detected by using the static rule. For example, the techniques are a method in which data included in the blacklist is regarded as the abnormality and other data are regarded as the normality, while data included in the whitlist is regarded as the normality and other data are regarded as the abnormality.

However, the method for detecting the abnormality or normality by using the static rule has a disadvantage in that the method does not reflect a change of the data. For example, there is a risk that in the case where data similar to the data registered in the blacklist is generated, the case may be determined as the normality, while in the case where data similar to the data registered in the whitelist is generated, the case may be determined as the abnormality.

As a more detailed example, it is assumed that there is a network that accommodates only a normal network packet by using the whitelist. In the network, even in the case where a new normal network packet is generated, which is very similar to a model in which the normal network packet is learned, that is, the whitelist, the case is determined as the abnormality and the normal network packet is not enabled to be accommodated. When the blacklist or whitelist is used as described above, flexibility may be lacking.

In the method for detecting the abnormality by using the static rule, a process is required, in which a manger determines whether new generated data is normal or abnormal and adds the determination to the blacklist or whitelist. Further, when all data are registered in the blacklist or whitelist, the rule becomes vast and it is difficult to manage the rule. In order to solve the problem, a method is required, which is capable of generating a model for detecting the normality or abnormality based on machine learning.

SUMMARY

An object to be achieved by the present disclosure is to provide a method for generating a one class model based on a data frequency and an apparatus for performing the method, by supplementing a disadvantage of a one class support vector machine in the related art.

Technical objects of the present disclosure are not limited to the aforementioned technical objects, and other objects, which are not mentioned above, will be apparent to a person having ordinary skill in the art from the following description.

According to an aspect of the present disclosure, there is provided a method for generating a one class model based on a data frequency. The method includes: generating, by a machine learning apparatus, a plurality of spatial coordinates by arranging a plurality of learning data in corresponding coordinates in a feature space; classifying, by the machine learning apparatus, the plurality of spatial coordinates into a plurality of internal coordinates PI and a plurality of external coordinates PO based on a frequency of the learning data arranged in the respective spatial coordinates which belong to the plurality of spatial coordinates; and generating, by the machine learning apparatus, a one class model based on the plurality of internal coordinates PI based on mutual spatial distances of the plurality of external coordinates PO and the plurality of internal coordinates PI.

The generating of the plurality of spatial coordinates may include binding learning data having the same structure among the plurality of learning data as a group and generating the plurality of spatial coordinates with respect to a first group.

The classifying of the plurality of spatial coordinates into the plurality of internal coordinates PI and the plurality of external coordinates PO may include classifying a first spatial coordinate into the internal coordinate PI when a frequency of learning data arranged in the first spatial coordinate is equal to or larger than a predetermined frequency threshold.

The classifying of the plurality of spatial coordinates into the plurality of internal coordinates PI and the plurality of external coordinates PO may include classifying the first spatial coordinate into the external coordinate PO when the frequency of the learning data arranged in the first spatial coordinate is less than the predetermined frequency threshold.

The generating of the one class model based on the plurality of internal coordinates may include calculating a distance between internal coordinates closest to a specific external coordinate as a similarity distance of the specific external coordinate.

The generating of the one class model based on the plurality of internal coordinates may further include calculating a value acquired by multiplying a largest value among the similarity distances of the plurality of external coordinates PO by a predetermined weight as a data accommodation radius.

The predetermined weight may have a value of 1 or more.

The generating of the one class model based on the plurality of internal coordinates may further include generating a union of respective spaces up to the data accommodation radius from the plurality of internal coordinates PI as the one class model.

The generating of the one class model based on the plurality of internal coordinates may further include storing the plurality of internal coordinates PI and the data accommodation radius in a storage space.

The method may further include: calculating, by the machine learning apparatus, diversities of the plurality of learning data based on the number of the plurality of learning data which has different values; and generating, by the machine learning apparatus, the plurality of spatial coordinates only when the diversities are less than a predetermined diversity threshold, classifying the plurality of spatial coordinates into the plurality of internal coordinates PI and the plurality of external coordinates PO, and generating the one class model.

According to another aspect of the present disclosure, provided is an apparatus for generating a one class model based on a data frequency. The apparatus includes: a network interface; one or more processors; memories loading computer programs executed by the processors; and storages storing a plurality of learning data, and the computer programs include an operation of generating a plurality of spatial coordinates by arranging the plurality of learning data in corresponding coordinates in a feature space, an operation of classifying the plurality of spatial coordinates into a plurality of internal coordinates PI and a plurality of external coordinates PO based on a frequency of the learning data arranged in the respective spatial coordinates which belong to the plurality of spatial coordinates, and an operation of calculating a distance between internal coordinates closest to respective external coordinates which belong to the plurality of external coordinates PO as a similarity distance of the respective external coordinates, calculating a value acquired by multiplying a largest value among the similarity distances of the plurality of external coordinates PO by a predetermined weight as a data accommodation radius, and generating a union of respective spaces up to the data accommodation radius from the plurality of internal coordinates PI as a one class model.

According to an exemplary embodiment of the present disclosure, a given data set is analyzed to generate one model. That is, a data set having the same format is analyzed to construct one model and the one model can be used for detecting abnormal data. In particular, the model can be effectively used for detecting an abnormal data packet in a security field.

The effects of the present disclosure are not limited to the aforementioned effect, and other effects, which are not mentioned above, will be apparent to a person having ordinary skill in the art from the following disclosure.

BRIEF DESCRIPTION OF THE DRAWINGS

The above and other aspects, features and other advantages of the present disclosure will be more clearly understood from the following detailed description taken in conjunction with the accompanying drawings, in which:

FIGS. 1A and 1B are diagrams for describing a learning based support vector machine (SVM) and a one class support vector machine (OCSVM) in the related art;

FIG. 2 is a flowchart of a method for generating a one class model based on a frequency according to an exemplary embodiment of the present disclosure;

FIGS. 3A to 5B are diagrams for describing each step of the method for generating a one class based on a data frequency of FIG. 2;

FIG. 6 is a diagram for describing a criterion for applying the method for generating a one class model based on a data frequency according to the exemplary embodiment of the present disclosure; and FIG. 7 is a hardware configuration diagram of an apparatus for generating a one class model based on a data frequency according to an exemplary embodiment of the present disclosure.

DETAILED DESCRIPTION OF THE PREFERRED EMBODIMENT

The present disclosure may have various modifications and various exemplary embodiments and specific exemplary embodiments will be illustrated in the drawings and described in detail in the detailed description. However, this does not limit the present disclosure to specific exemplary embodiments, and it should be understood that the present disclosure covers all the modifications, equivalents and replacements included within the idea and technical scope of the present disclosure. In describing each drawing, reference numerals refer to like elements.

Terms including as first, second, A, B, and the like are used for describing various constituent elements, but the constituent elements are not limited by the terms. The terms are used only to discriminate one constituent element from another component. For example, a first component may be referred to as a second component, and similarly, the second component may be referred to as the first component without departing from the scope of the present disclosure. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, it should be understood that, when it is described that an element is "directly connected to" or "directly access" another element, it is understood that no element is present between the element and another element.

Terms used in the present application are used only to describe specific exemplary embodiments, and are not intended to limit the present disclosure. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, exemplary embodiments of the present disclosure will be described in detail with reference to the accompanying drawings.

FIGS. 1A and 1B are diagrams for describing a learning based support vector machine (SVM) and a one class support vector machine (OCSVM) in the related art.

FIG. 1A is a diagram for describing a support vector machine (SVM). Referring to FIG. 1A, it can be seen that there are two types of data sets. One is a quadrangular (■) data set and the other one is a circular (●) data set. When there are two types of data sets as described above, the model is generated by learning two types of data sets and when new data is generated, the support vector machine may be used in order to classify whether the corresponding data is quadrangular or circular.

The support vector machine as one of fields of the machine learning corresponds to supervised learning. That is, the support vector machine is a machine learning method in which a result is already included in training data for generating the model and the model is generated by using the result. The support vector machine is primarily used for classification for pattern recognition and data analysis.

The support vector machine aims at extracting features from the learning data, maps each data on an n-dimensional feature space, which are as many as the features to a spatial coordinate, and acquiring a decision boundary capable of distinguishing an active class and an inactive class, that is, a hyperplane.

Referring to FIG. 1A, a decision boundary 120 is generated by reference numerals 111 and 113 close to circular data among quadrangular data and reference numerals 131 and 133 close to the quadrangular data among the circular data. The decision boundary 120 is referred to as a hyperplane 120 in other words.

A distance closest to each data set from the hyperplane 120 is referred to as a margin. In the support vector machine, as the margin is larger, a classifier error becomes smaller. The support vector machine relates to a method for generating the hyperplane 120 having a largest margin, which separates two types of data sets through a machine learning process as a model.

In an example of FIG. 1A, when new data is generated above the hyperplane 120, the new data may be classified into a quadrangular shape and when the new data is generated below the hyperplane 120, the new data may be classified into a circular shape. Herein, the hyperplane 120 is a boundary on a space map to which data is mapped. However, in some cases, two data sets may not be clearly separated by the hyperplane 120.

When a problem in which the data is not linearly distinguished occurs as described above, a kernel trick may be used in order to map the data to a high-dimension space. Detailed contents regarding the kernel trick may be verified in a Wikipedia page of https://en.wikipedia.org/wiki/Kernel_method.

As illustrated in FIG. 1A, the support vector machine classifies two types of data sets by learning. The model, that is, the hyperplane 120 is generated by learning the quadrangular active class (+1) and the circular inactive class (−1) and when the new data is generated, it is classified whether the corresponding data belongs to the active class or the inactive class based on the hyperplane 120.

However, in some cases, even when two types of data sets are not sufficient, the learning needs to be performed. For example, it is assumed that the support vector machine is applied to the network packet. A packet generated by using a general network is assumed as a normal packet and a network packet generated by a malicious code or virus is assumed as an abnormal packet.

In this case, in some cases, the machine learning may need to be performed in a situation where the abnormal packet is not sufficient. Since a normally operated system may not be made to be intentionally infected with the malicious code or virus in order to ensure the abnormal packet as the learning data, the machine learning may need to be performed only with one type of data. In this case, an applicable machine learning algorithm is a one class support vector machine (OCSVM).

FIG. 1B is a diagram for describing a one class support vector machine. Referring to FIG. 1B, it can be seen that there are all circular (○) data of the same type. However, since there is no data of a type different from the circular data, the hyperplane 120 may not be acquired by the support vector machine in the related art. In this case, a one class support vector machine which is applicable acquires the hyperplane 120 based on only one type of data and classifies data which deviates from the hyperplane 120 as an outlier even though the data which deviates from the hyperplane 120 is circular and disregards the classified data.

Referring to FIG. 1B, the hyperplane 120 is configured based on four circular data 141a, 141b, 141c, and 141d so as to include most circular data and three circular data 143a, 143b, and 143c below the hyperplane 120 are classified as the outlier even though three circular data 143a, 143b, and 143c are circular.

Unlike the blacklist or whitelist, when the support vector machine or one class support vector machine is used, even though new data is generated, the new data may be classified based on the model generated by using the learning data in the related art. That is, when the new data may be classified based on the hyperplane 120, flexibility may be ensured. However, since a one class support vector machine performs the learning with only one type of data set, there is a problem in which the outlier occurs.

That is, when a one class support vector machine is used, there is an advantage in that the model may be generated even with only one type of data set, but since the model may be generated in a situation in which there is no other compared data set, an error may occur, in which even normal data is determined as the abnormality or even abnormal data is determined as the normality in some cases. Such an error may be problematic in particular when there are a lot of relatively format data.

For example, in a network of industrial control systems (ICS), network packets of a relatively smaller number and a relatively smaller number of types than the general Internet are transmitted/received. Examples of the industrial control systems include infrastructure processes required for sewage treatment, power transmission and distribution, power plant, air defense and civil defense systems, and large-scale communication systems or a facility process required for building, airport, and shipbuilding systems.

A supervisory control and data acquisition (SCADA) system represents a system for supervising and controlling the industrial control systems. In the SCADA system, a restricted user sends and receives only restricted data by accessing the SCADA system through a human-machine interface (HMI) unlike a general network. Therefore, there are not many types of packets to be learned so far, so a one class support vector machine cannot but be applied.

However, when a one class support vector machine is applied to the SCADA system, a data packet excluded as the outlier may be actually generated during the learning in spite of the normal data packet. When it is considered that the SCADA system takes charges of important infrastructures, facilities, and the like, in the case where the normal data packet is excluded, an aftermath thereof may become larger.

For example, when a power plant control signal is excluded as the outlier and not thus transferred to a generator, a large problem such as a power outage. When the machine learning such as a one class support vector machine is applied in order to detect the abnormal packet in the SCADA system as described above, the learning needs to be enabled to be performed and the model needs to be enabled to be generated with the outlier.

FIG. 2 is a flowchart of a method for generating a one class model based on a frequency according to an exemplary embodiment of the present disclosure.

Stuxnet as worm virus discovered in June, 2010 is malicious virus that attacks software and equipment of a Windows based Siemens industry of Microsoft. A uranium concentration facility of Iran is attacked by Stuxnet. Besides, a malicious code called BlackEnergy attacks a power supply company of Ukraine to cause a large-scale power outage. The machine learning may be used for detecting the malicious code or virus made to attack the industrial control systems.

However, since the number and types of packets are restrictive in the SCADA system as described above, it is difficult to apply a normal support vector machine and a one class support vector machine needs to be applied. However, since a one class support vector machine has a disadvantage in excluding some normal data as the outlier and generating the model, a one class model generating method which is capable of the disadvantage is required.

The one class model generating method proposed in the present disclosure is a method for generating a model which may include even all outliers. The one class model generating method proposed in the present disclosure is useful when machine-learning data of a relatively smaller number and a relatively smaller number of types. Further, the one class model generating method is useful when intending to generate a model including all data which are normal.

Referring to FIG. 2, first, the frequency of each data is calculated with respect to one type of learning data, that is, a one class data set (S1100). In the present disclosure, since the model including all data which are normal is generated, the frequency of the data is used for sorting data which may become the center of the model.

Since the support vector machine disposes the learning data in a feature space as the spatial coordinate, the frequency of the corresponding spatial coordinate may be acquired based on the number of learning data which are disposed in the same spatial coordinate. That is, the frequency of the learning data of a specific value is calculated based on the number of learning data having the same value.

After calculating the frequency of each data, internal data and external data are sorted based on the corresponding frequency (S1200). Herein, as a criterion for distinguishing the internal data and the external data, a predetermined frequency threshold may be used. In the one class support vector machine in the related art, the external data is excluded as the outlier, but in the present disclosure, in order to generate a model including even the external data, a distance between the internal data and the external data is calculated (S1300) and a data accommodation radius which may including the external data is calculated (S1400). In addition, a space up to the data accommodation radius is generated as the decision boundary around the internal data (S1500).

A detailed description of the step (S1100) of calculating the frequency in FIG. 2 will be made in FIGS. 3A and 3B and the detailed description of a step (S1200) of distinguishing the internal data and the external data, steps (S1300 and S1400) of calculating an accommodation radius, and a step (S1500) of generating the decision boundary will be made later in FIG. 4, and FIGS. 5A and 5B.

FIGS. 3A to 5B are diagrams for describing each step of the method for generating a one class based on a data frequency of FIG. 2.

Referring to FIG. 3A, there is a data set for learning. The data set as the network packet of the SCADA system is data packets of which all are normal. The one class model generating method used in the present disclosure is principally applied to a data set in which a structure and a value of a packet are not relatively various.

However, like the case of FIG. 3A, even when the structure of the packet is slightly different, the same data field may be extracted and used as a feature. That is, packets having the same data field are grouped to separate the group of the packet and thereafter, perform the learning. Referring to FIG. 3B, packet group 1 in which a payload is constituted by fields A, B, and C, packet group 2 in which the payload is constituted by fields A, C, and D, packet group 3 in which the payload is constituted by field B, and packet group 4 in which the payload has only a header may be seen.

Even though the structure of the packet is slightly varied, the packets having the same structure may form the group and thereafter, the machine learning may be performed. For example, packets having values of fields A, B, and C which are the same as each other are grouped as the same packet type. Next, the number of packets which belong to the corresponding type is counted for each packet type to calculate the frequency of the packet type depending on the values of fields A, B, and C (S1100).

Since learning data having the values of fields A, B, and C which are the same as each other are grouped as the same packet type and the learning data is disposed in one spatial coordinate in the feature space per packet type, the frequency of the spatial coordinate, that is, the frequency of the packet type may be calculated based on the number of learning data disposed in the spatial coordinate.

Referring to FIG. 4, it can be seen that a packet having the same payload value among the packets which belong to packet group 1, that is, the packet type is displayed in the space. Among them, a total of n packet types of $PI_1$ to $PI_n$ which represent a frequency which exceeds a predetermined threshold exist. The packet types are data which, when the decision boundary is made with data which may be frequently seen on the network of the SCADA system, the center of the decision boundary.

Referring to FIG. 4, it can be seen that a first boundary 150 includes a total of n data from $PI_1$ to $PI_n$. The one class support vector machine in the related art generates the first boundary 150 and disregards the external data, that is, a total of x data in which the packet types are from $PO_1$ to $PO_x$ as the outlier based on the first boundary. However, in the present disclosure, since the model including even the outlier which is the normal packet needs to be originally generated, the first boundary 150 needs to be extended.

To this end, the internal data and the external data are distinguished from each other based on a criterion indicating whether the frequency of the packet type exceeds a predetermined threshold (S1200). The internal data as data in which the frequency of the packet type exceeds the threshold are data included in the first boundary 150. Next, the external data as data in which the frequency of the packet type does not exceed the threshold are data positioned outside the first boundary 150.

The internal data included in the first boundary 150 may referred to as, in other words, an internal coordinate or an internal space coordinate. Similarly, the external data positioned outside the first boundary 150 may referred to as, in other words, an external coordinate or an external space coordinate. Hereinafter, the internal data is used as a synonym of the internal coordinate or internal space coordinate and the external data is used as the synonym of the external coordinate or external space coordinate.

Next, distances up to a total of n packet types from $PI_1$ to $PI_n$ positioned in the first boundary 150 are acquired to calculate minimum values thereof as a similarity distance of the external data, with respect to a total of x respective packet types from $PO_1$ to $PO_x$ positioned outside the first boundary 150 (S1300). This may be expressed like an equation of FIG. 5A. That is, a function D for acquiring the similarity distance up to the external data $PO_x$ and the internal data represents a distance from the internal data which is closest to $PO_x$.

Herein, the distance may be acquired by using various methods. For example, when the feature is extracted based on the value of the field of the payload and the feature is mapped to the space as illustrated in FIG. 4, a geometric distance between coordinates at which the respective packet types are positioned in the corresponding space may be used.

After the similarity distances of the external data are acquired, the acquired similarity distances are compared with each other to acquire a largest value and the largest value is multiplied by a weight m to calculate the data accommodation radius (S1400). Referring to FIG. 4, since $PI_1$ is closest to the external data $PO_1$, a distance between $PO_1$ and $PI_1$ becomes $D(PO_1)$. In addition, since $PI_2$ is closest to the external data $PO_2$, the distance between PO and $PI_2$ becomes $D(PO_2)$. Moreover, since $PI_n$ is closest to the external data $PO_n$, the distance between $PO_n$ and PI, becomes $D(PO_n)$. Similarly, since $PI_2$ is closest to the external data $PO_x$, the distance between $PO_x$ and $PI_2$ becomes $D(PO_x)$.

The distance up to the internal data which is closest to each external data is calculated as the similarity distances and the similarity distances of the respective external data are compared with each other to acquire a distance having the largest value. In the example of FIG. 4, it can be seen that $D(PO_x)$ has the largest value. When the value is just used, a new decision boundary including the external data may be made, but in the present disclosure, since the external data is also normal, the new data accommodation radius R is acquired by multiplying the value of $D(PO_x)$ by the weight m which is equal to or larger than 1 so as to determine the data similar to the external data to be normal (S1500). An equation for acquiring the data accommodation radius R may be seen in FIG. 5B.

Referring to FIG. 4, a region which is separated by 161 which is the data accommodation radius R around the internal data $PI_1$ may be determined as a decision boundary 171 of the center of the internal data $PI_1$. In addition, a region which is separated by 162 which is the data accommodation radius R around the internal data $PI_2$ may be determined as a decision boundary 172 of the center of the internal data $PI_2$. Similarly, a region which is separated by 169 which is the data accommodation radius R around the internal data $PI_n$ may be determined as a decision boundary 179 of the center of the internal data $PI_n$.

The regions within the data accommodation radius are determined as the decision boundary in the space based on each internal data and all of the regions are made into a union to generate a new model. That is, in the example of FIG. 4, the union of the regions made by reference numerals 171 to 179 is determined as a new decision boundary and when new data is included in the corresponding region, the new data may be determined as the normal packet and when the new data is included outside the corresponding region, the new data may be determined as the abnormal packet.

In the data frequency based one class model generating method proposed in the present disclosure, the machine learning may be performed even based on only data which is normal among the learning data and a model including all data which are normal may be generated unlike the one class support vector machine. In addition, since a one class model proposed in the present disclosure is formed based on the PI corresponding to the internal data and the data accommodation radius R, a result of the machine learning has values of PI and R. The internal data PI and the data accommodation radius R which are the result may be stored as the one class model.

In the one class model generating method proposed in the present disclosure, two values needs to be previously set and provided in advance during a machine learning process. One is the threshold of the frequency to distinguish the internal data and the external data and the other one is the value of the weight m by which the largest value among the distances between the internal data and the external data will be multiplied. Herein, m has a value equal to or larger than 1 like 1.2 or 1.5. The internal data PI and the data accommodation radius R may be acquired by using the threshold T of the frequency and the weight m of the distance.

Hereinabove, the data frequency based one class model generating method proposed in the present disclosure has been described. When the method proposed in the present disclosure is used, a problem in which the outlier may be dropped may be prevented at the time of performing the machine learning with respect to one more formal data set. Further, since only the values of the internal data PI and the data accommodation radius R need to be stored, the model may be generated with a smaller data size.

FIG. 6 is a diagram for describing a criterion for applying the method for generating a one class model based on a data frequency according to the exemplary embodiment of the present disclosure.

The one class model generating method proposed in the present disclosure may be used in combination with the blacklist and the whitelist or the one class support vector machine in the related art. That is, as illustrated in FIG. 6, the whitelist may be generated by processing the learning data and the normal data may be determined based on the whitelist.

Alternatively, diversity of the learning data may be measured and the one class support vector machine in the related art or the one class model generating method proposed in the present disclosure may be applied according to the diversity. For example, when it is difficult to use the support vector machine in the related art because the learning data is one type, the hyperplane may be acquired by using the one class support vector machine (OCSVM) in the related art when the values are variously distributed and it may be determined whether new data is normal or abnormal based on the hyperplane.

On the contrary, when it is the same in that the type of the data is one type, but when the value of the data is not various, for example, in the case of the network packet of the SCADA system, the internal data PI and the data accommodation radius R may be acquired by using the one class model generating method proposed in the present disclosure and it may be determined whether new data is normal or abnormal based on the acquired internal data PI and data accommodation radius R. In FIG. 6, the one class model proposed in the present disclosure is represented as a name called representative model.

A method for measuring diversity of data may be performed through various criteria. For example, in the packet group generated by binding packets having the same packet structure, the diversity of the packet may be measured based on a distinct count of packets having different payloads.

When the number of packets having different payloads is larger than a predetermined value, it is regarded that the diversity is large to use the one class support vector machine and when the number of packets is smaller than the predetermined value, it is regarded that the diversity is small to use the one class model generating method proposed in the present disclosure.

FIG. 7 is a hardware configuration diagram of an apparatus for generating a one class model based on a data frequency according to an exemplary embodiment of the present disclosure.

Referring to FIG. 7, the apparatus for generating a one class model based on a data frequency may include one or more processors 510, memories 520, storages 560, and interfaces 570. The processor 510, the memory 520, the storage 560, and the interface 570 transmit/receive data through a system bus 550.

The processor 510 executes a computer program loaded to the memory 520 and the memory 520 loads the computer program in the storage 560. The computer program may include a generation frequency calculation operation 521, an accommodation radius calculation operation 523, and a decision boundary generating operation 525.

The generation frequency calculation operation 521 loads learning data 561 stored in the storage 560 through the system bus 550 and calculates a generation frequency for each value of each data by processing the learning data. Data in which the generation frequency is larger than the predetermined value is classified as the internal data PI and data in which the generation frequency is smaller than the predetermined value is classified as the external data PO. In addition, the generation frequency calculation operation 521 stores information on the generation frequency for each data as frequency information 563 of the storage 560 through the system bus 550.

The accommodation radius operation 521 calculates a smallest value among the distances from each external data PO up to each internal data PI as the similarity distance of the corresponding external data PO and calculates the data accommodation radius R by multiplying a largest value among the similarity distances of a plurality of Pos by a predetermined weight m. In addition, the acquired data accommodation radius R and plural internal data PI are stored in the one class model 565 of the storage 560 through the system bus 550.

Last, in the decision boundary generation operation 525, the one class model 565 stored in the storage 560 is loaded through the system bus 550. The plurality of internal data PI and one data accommodation radius R are stored in the one class model 565. When the union of a region from each internal data up to the data accommodation radius R is generated as the decision boundary, data may be classified based on the corresponding decision boundary. In the decision boundary generation operation 525, a measurement value is received from a separate device that intends to monitor data through the interface 570 later and the received measurement value is compared with the decision boundary to determine whether the data is abnormal or normal.

Each component of FIG. 7 may mean software or hardware such as field programmable gate array (FPGA) or application-specific integrated circuit (ASIC). However, the components are not meanings limited to the software or hardware and may be configured to be positioned in a storage medium which is addressable or configured to execute one or more processors. Functions provided in the components may be implemented by more subdivided components and implemented as one component that performs a specific function by combining a plurality of components.

Hereinabove, the exemplary embodiments of the present disclosure have been described with the accompanying drawings, but it can be understood by those skilled in the art that the present disclosure can be executed in other detailed forms without changing the technical spirit or requisite features of the present disclosure. Therefore, it should be appreciated that the aforementioned exemplary embodiments are illustrative in all aspects and are not restricted.

What is claimed is:

1. A method for generating a one class model based on a data frequency, the method comprising:
   generating, by a machine learning apparatus, a plurality of spatial coordinates by arranging a plurality of learning data in corresponding coordinates in a feature space;
   classifying, by the machine learning apparatus, the plurality of spatial coordinates into a plurality of internal coordinates PI and a plurality of external coordinates PO based on a frequency of the learning data arranged in the respective spatial coordinates which belong to the plurality of spatial coordinates; and
   generating, by the machine learning apparatus, a one class model based on the plurality of internal coordinates PI based on mutual spatial distances of the plurality of external coordinates PO and the plurality of internal coordinates PI,
   wherein the generating of the one class model based on the plurality of internal coordinates includes calculating a distance between internal coordinates closest to a specific external coordinate as a similarity distance of the specific external coordinate.

2. The method of claim 1, wherein the generating of the plurality of spatial coordinates includes binding learning data having the same structure among the plurality of learning data as a group and generating the plurality of spatial coordinates with respect to a first group.

3. The method of claim 1, wherein the classifying of the plurality of spatial coordinates into the plurality of internal coordinates PI and the plurality of external coordinates PO includes classifying a first spatial coordinate into the internal coordinate PI when a frequency of learning data arranged in the first spatial coordinate is equal to or larger than a predetermined frequency threshold.

4. The method of claim 1, wherein the classifying of the plurality of spatial coordinates into the plurality of internal coordinates PI and the plurality of external coordinates PO includes classifying the first spatial coordinate into the external coordinate PO when the frequency of the learning data arranged in the first spatial coordinate is less than the predetermined frequency threshold.

5. The method of claim 1, wherein the generating of the one class model based on the plurality of internal coordinates further includes calculating a value acquired by multiplying a largest value among the similarity distances of the plurality of external coordinates PO by a predetermined weight as a data accommodation radius.

6. The method of claim 5, wherein the predetermined weight has a value of 1 or more.

7. The method of claim 5, wherein the generating of the one class model based on the plurality of internal coordinates further includes generating a union of respective spaces up to the data accommodation radius from the plurality of internal coordinates PI as the one class model.

8. The method of claim 5, wherein the generating of the one class model based on the plurality of internal coordinates further includes storing the plurality of internal coordinates PI and the data accommodation radius in a storage space.

9. The method of claim 1, further comprising:
calculating, by the machine learning apparatus, diversities of the plurality of learning data based on the number of the plurality of learning data which has different values; and
generating, by the machine learning apparatus, the plurality of spatial coordinates only when the diversities are less than a predetermined diversity threshold, classifying the plurality of spatial coordinates into the plurality of internal coordinates PI and the plurality of external coordinates PO, and generating the one class model.

10. An apparatus for generating a one class model based on a data frequency, the apparatus comprising:
a network interface;
one or more processors;
memories loading computer programs executed by the processors; and
storages storing a plurality of learning data,
wherein the computer programs include
an operation of generating a plurality of spatial coordinates by arranging the plurality of learning data in corresponding coordinates in a feature space,
an operation of classifying the plurality of spatial coordinates into a plurality of internal coordinates PI and a plurality of external coordinates PO based on a frequency of the learning data arranged in the respective spatial coordinates which belong to the plurality of spatial coordinates, and
an operation of calculating a distance between internal coordinates closest to respective external coordinates which belong to the plurality of external coordinates PO as a similarity distance of the respective external coordinates, calculating a value acquired by multiplying a largest value among the similarity distances of the plurality of external coordinates PO by a predetermined weight as a data accommodation radius, and generating a union of respective spaces up to the data accommodation radius from the plurality of internal coordinates PI as a one class model.

* * * * *